Aug. 24, 1954 T. I. PRZYSIECKI 2,687,265

TAPE REEL HOLDER

Filed March 30, 1950 2 Sheets-Sheet 1

INVENTOR
THEODORE I. PRZYSIECKI
BY Emery Robinson
ATTORNEY

INVENTOR
THEODORE I. PRZYSIECKI
BY Emery Robinson
ATTORNEY

Patented Aug. 24, 1954 2,687,265

UNITED STATES PATENT OFFICE 2,687,265

TAPE REEL HOLDER

Theodore I. Przysiecki, Park Ridge, Ill., assignor to Teletype Corporation, Chicago, Ill., a corporation of Delaware Application March 30, 1950, Serial No. 152,810

2 Claims. (Cl. 248—298)

The present invention relates to tape reel holders, and more particularly to movable tape reel holders.

Tape reel holders are known in the art and are available which allow ready replacement of the tape reels when the supply of tape is exhausted. However, generally such holders are designed for use where they are in the open and thus replacement is no great problem.

In certain cases however, where tape reels are mounted on devices which are covered and particularly small portable devices, a problem exists to include tape reel holders on which the tape reel may be easily and quickly replaced.

Accordingly, an object of the present invention is to provide a tape reel holder for covered portable devices which permits rapid and facile replacement of the tape reel.

A further object of the present invention is to provide a tape reel holder for a covered portable device which will permit replacement of the tape reel without removal of the cover.

A still further object of the present invention is to provide a tape reel holder for use with a covered device which may be removed slidably from within the cover to replace the tape reel.

The invention comprises generally a tape reel holder which is mounted normally within a covered device but which through the use of slidable members may be removed from under the cover to replace the tape reel.

The present invention is illustrated and described for use with a portable telegraph keyboard transmitter fitted within a carrying case, but obviously may have application with other devices, such as typewriters, adding machines, etc.

A full understanding of the device and its operation may be had by reference to the following detailed description, when read in conjunction with the accompanying drawings, wherein Fig. 1 is a perspective view of the telegraph carrying case, partly broken away to show a portion of the keyboard transmitter and the slidable tape reel holder;

Figure 1:
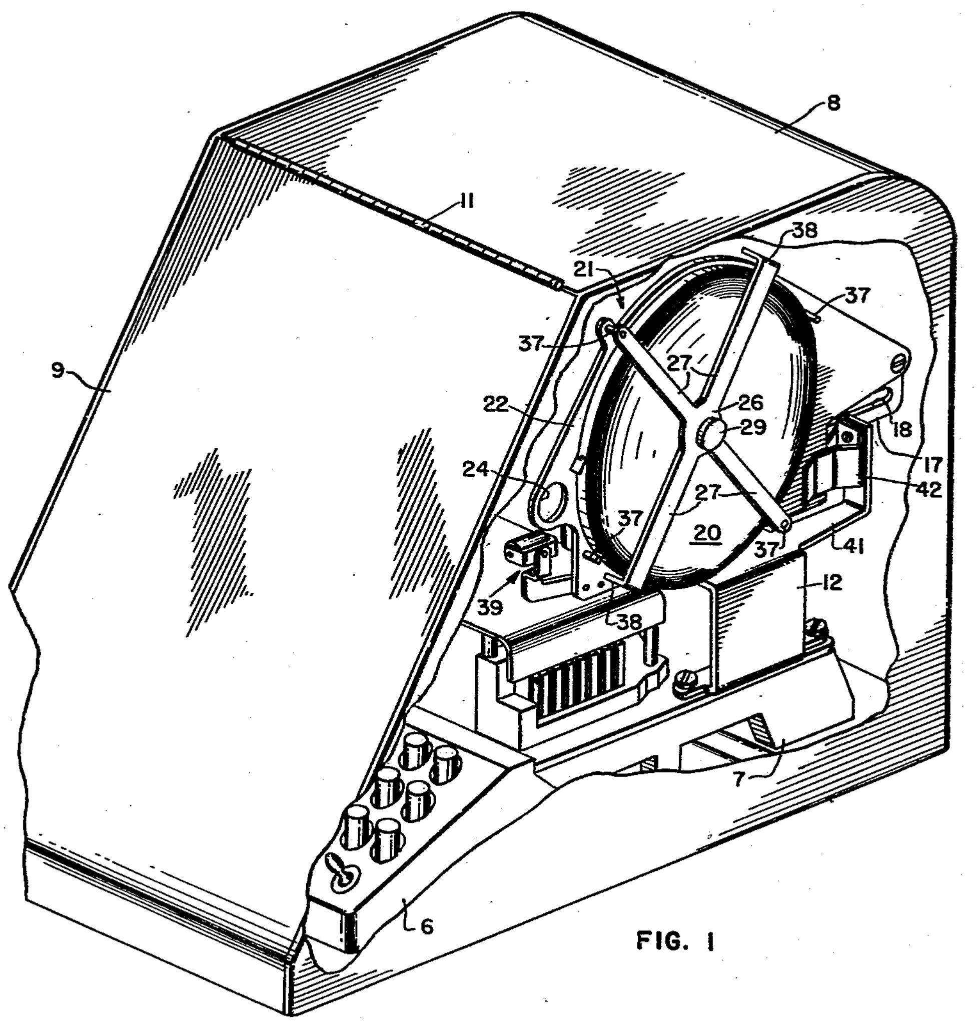

By reference to Fig. 1 it may be seen that a telegraph keyboard transmitter, illustrated schematically as comprising a keyboard 6 which is secured to a base 7, is mounted by any suitable means within a carrying case 8. The carrying case 8 is provided with a lid 9 which is hinged at 11 and may be retained in its closed position as illustrated in Fig. 1 or may be opened through pivoting about the hinge 11.

Secured to the base 7 near one extremity and toward the rear is a bracket 12 which is provided with two holes, not shown. A pair of bolts 13, Fig. 2, pass through the two holes on each of which is secured a bushing 15. A pair of nuts 14 secure the bolts and bushings in place, with a large washer 16 being between the bolt head and the bushing.

A relatively flat slide 17 is provided which is formed with two longitudinal slots 18 and 19 therein. The slide 17 is assembled to the bracket 12 by means of the bolts 13 and bushings 15 thereon being passed through the slot 18 and the bracket 12, and the nuts 14 then being tightened in place. The washers 16 are on the opposite end of the bushings from the bracket 12.

In this manner the slide 17 will be secured to the plate 12, but because the bushings 15 pass through the slot 18 the slide 17 is movable longitudinally with respect to the bracket 12, such movement amounting to approximately one-half the length of the slide 17.

A tape reel holder indicated generally by the numeral 21, and formed of a plate 22 having a central opening, not shown, is connected to the slide 17 by means of bushing and bolt assemblies indicated generally as 23, similar to the assemblies formed of the bolt 13, nut 14, bushing 15 and washer 16. In this case however the connection is through the upper slot 19 in the slide 17, and so the plate 22 may be moved with respect to the slide 17. In this case also the movement is longitudinal and is to an extent of about one-half the length of the slide 17.

The plate 22 is provided near its forward extremity with a circular opening 24 for the purpose of engaging the plate and urging it in either direction.

A tape reel retainer and guide is formed of a hub portion 26 and crossed arms 27. The hub portion 26 has a central opening through which passes a stud 28, Fig. 4, which has a knurled thumb screw portion 29 at one extremity and a smaller diameter portion 31 having a circumferential notch 32 at the opposite extremity. The portion 31 is provided to enter the central opening in the plate 22, the hub 28 passing within the central opening in a roll of tape 20 and thus securing it to the plate 22.

Figure 4:
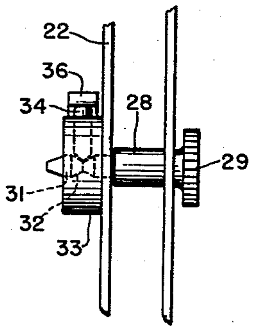
Fig. 4 is a detail of a method of securing the tape reel to the tape reel holder.

A collar 33, Fig. 4, provided with a central opening for receiving the smaller diameter portion 31 of the hub 28 is formed with an opening for receiving a pin 34 having its lower extremity tapered for cooperation with the notch 32. The pin 34 is retained in engagement with the notch 32 by means of a detent spring 36. In the above manner the tape reel 20 will be retained in position against the plate 22 by the retainer 26—27. The tape reel 20 may rotate on the hub 28.

The plate 22 is provided with pins 37 placed to cooperate with openings near the extremity of two of the arms 27 so that the retainer formed of the hub portion 26 and the arms 27 may be held in place and to allow the tape on the reel 20 to be guided by flanged portions 38 at the extremity of the other two arms 27.

The plate 22 also has secured thereto a swivel tape guide indicated generally by the numeral 39 to ensure that the tape will be fed in the proper manner to the keyboard transmitter.

The bracket 12 is also provided with an extending arm 41 which is provided with a spring clip 42 for engagement with the plate 22, to retain the holder in its normal or within the carrying case position, illustrated in Fig. 1.

Figure 3:
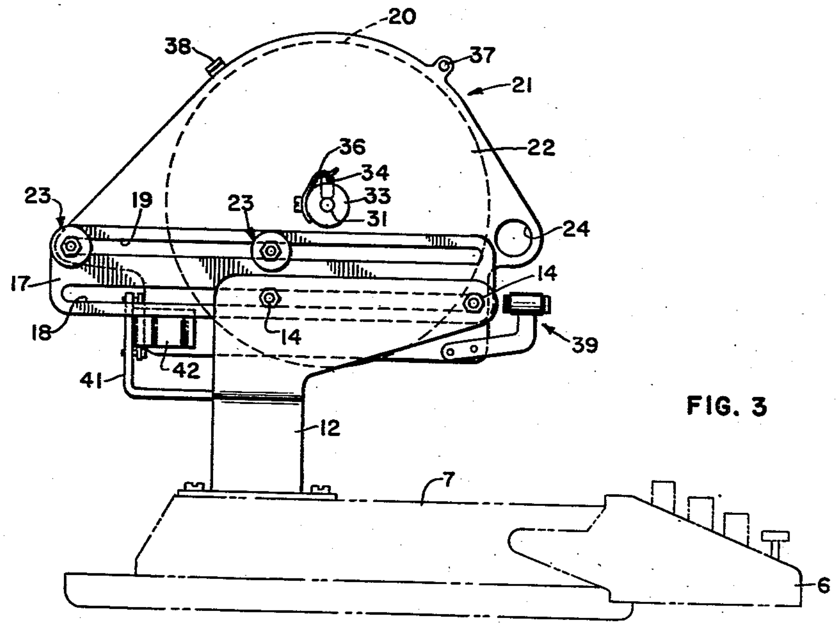
Fig. 3 is a similar view to Fig. 2 but is taken from the opposite side and shows the tape reel holder in its position within the carrying case.

The operation of the device may best be described by first referring to Fig. 1 where the tape reel holder is shown completely within the carrying case 8, in its normal or unoperated position. This position with respect to the bracket 12, slide 17 and plate 22 is also illustrated in Fig. 3.

If the tape reel 20 should become exhausted of its supply of tape and it is necessary to replace it, the lid 9 of the carrying case 8 should be pivoted about the hinge 11 to its open, upward position.

Figure 2:
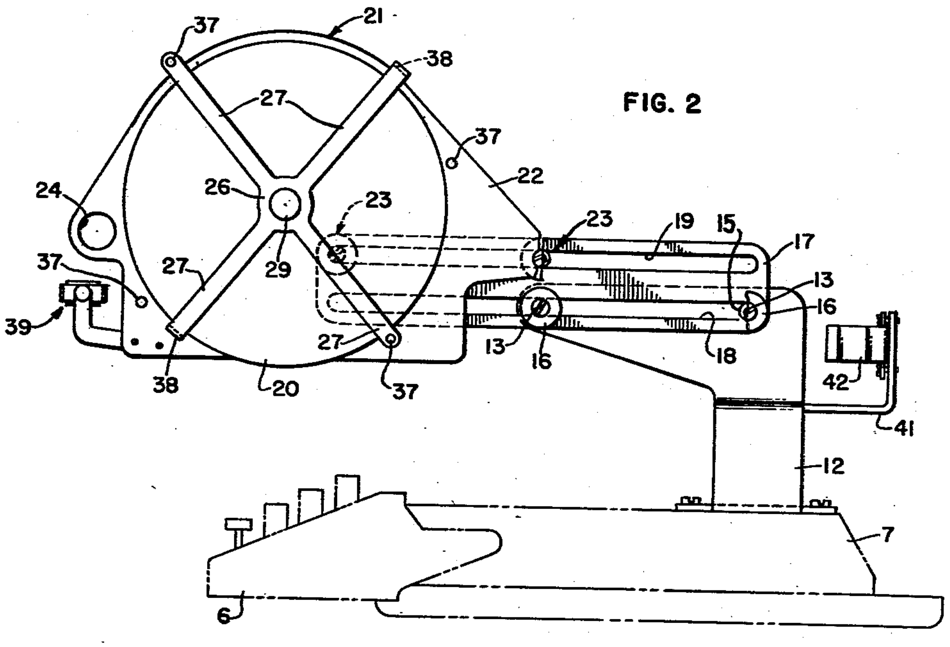
Fig. 2 is a side view of the tape reel holder showing schematically its connection to the keyboard transmitter, the holder being shown in a position for tape reel replacement.

The finger opening 24 should then be grasped and the plate 22 urged leftwardly, Fig. 2, which will result in the plate moving leftwardly in the slot 19 on the bushings. The spring clip 42 will have, of course, released plate 22 through pressure. The plate 22 will move leftwardly, Fig. 2, until the leftward assembly 23 engages the similar end of the slot 19.

Thereafter, as further pressure is applied, the slide 17 will also be urged in a leftward direction, movement being permitted because of its slot 18 and its connection with the bushings 15 and the bolts 13 to the bracket 12. The slide 17 may move until the rightward end of the slot 18 engages the rightward bushing 15 on its associated bolt 13.

Through the double movement described above the holder will move sufficiently to be clear of the carrying case 8, thus permitting a rapid and facile replacement of the tape reel 20.

It is obvious that to replace the holder within the carrying case 8 it is only necessary to exert pressure to the plate 22 in a rightward direction, Fig. 2, until the holder resumes its normal position with a portion of plate 22 engaged by the spring clip 42.

While the instant invention has been described in a specific embodiment and for utilization with particular apparatus, it is obvious that it could be incorporated in or with apparatus of other types where similar needs are present or desired, and further is not to be limited to the specific embodiment shown but for any embodiments within the scope and spirit of the invention. Further, while the invention is defined as utilizing tape it is obvious that ribbon or any similar medium may be used.

What is claimed is:

1. A device for mounting tape reels for use in portable telegraph transmitters comprising a member rigidly mounted to the telegraph transmitter base having a pair of bushings secured thereto at opposite extremities thereof and in the same horizontal plane, a slide having a pair of parallel longitudinal slots therein, said slide being secured to said member by said bushings on said member entering one of the slots in said slide in a manner that said slide may be moved longitudinally with respect to said member, and means on which a tape reel may be mounted having a pair of bushings secured thereto at opposite extremities thereof and in the same horizontal plane, said tape reel mounting means being secured to said slide by said bushings on said means entering the other of the slots in said slide in a manner that said means may be moved longitudinally with respect to said slide, whereby when said tape reel mounting means is moved with respect to said slide and said slide is moved with respect to said member a tape supply may be readily replenished.

2. A bracket for mounting tape reels for use in portable telegraph transmitters comprising a member rigidly mounted to the telegraph transmitter base and extending upwardly therefrom, a relatively flat slide having a pair of longitudinally extending parallel slots therein, means for securing said slide to said member through cooperation with one of said slots in a manner that said slide may be moved longitudinally with respect to said member, a relatively flat plate on which a tape reel may be mounted, and means for securing said plate to said slide through cooperation with the other of said slots in said slide in a manner that said plate may be moved longitudinally with respect to said slide, whereby when said plate is moved with respect to said slide and said slide is moved with respect to said member a tape supply may be readily replenished.

References Cited in the file of this patent

UNITED STATES PATENTS

| Number | Name | Date |
|---|---|---|
| 947,842 | Ohnstrand | Feb. 1, 1901 |
| 1,370,453 | Kilgour | May 1, 1921 |
| 2,151,877 | Walker | Mar. 28, 1939 |
| 2,295,697 | Sulentic | Sept. 15, 1942 |
| 2,334,689 | Wooster | Nov. 23, 1943 |
| 2,380,644 | Grondona | July 31, 1945 |
| 2,386,757 | Straubel | Oct. 16, 1945 |
| 2,459,252 | Strahan | Jan. 18, 1949 |